United States Patent

Silvis et al.

[11] Patent Number: 5,558,458
[45] Date of Patent: Sep. 24, 1996

[54] CONNECTOR

[75] Inventors: Gary Silvis; Thomas E. Howland, both of Georgetown; Steven R. Snoke, Batavia, all of Ohio

[73] Assignee: Stanley Mechanics Tools, Georgetown, Ohio

[21] Appl. No.: 391,644

[22] Filed: Feb. 21, 1995

[51] Int. Cl.⁶ ........................................................ F16B 5/07
[52] U.S. Cl. .......................... 403/393; 403/386; 403/384; 411/175; 411/523
[58] Field of Search ..................................... 403/393, 397, 403/386, 384, 408.1, 410, 405.1; 411/174, 175, 522–524

[56] References Cited

U.S. PATENT DOCUMENTS 2,251,644  8/1941  Tinnerman ........................... 411/175 X
2,286,042  6/1942  Tinnerman ............................... 411/523
2,511,805  6/1950  Kral ..................................... 411/522 X
4,531,340  7/1985  Sauer .................................. 403/393 X

*Primary Examiner*—Anthony Knight
*Attorney, Agent, or Firm*—Standley & Gilcrest

[57] ABSTRACT

A connector is disclosed that comprises a catch within a tab extending from one component that locks into a receiving opening on another component. The second component slides between the tab on the first component and the first component from which the tab extends and locks when the catch is received by the receiving opening of the second component.

11 Claims, 2 Drawing Sheets

5,558,458

CONNECTOR

BACKGROUND AND SUMMARY OF THE INVENTION

The present invention relates generally to the art of connectors and more particularly to an apparatus for easily and speedily connecting components without requiring extensive tooling.

Assemblers have had many methods and devices available for connecting components. As a few examples, an assembler connecting sheet metal components can rivet, screw, weld, glue, and bolt components together. However, these methods may require extensive tooling, skill and time and may also mandate a permanence that prevents disassembly.

The present invention overcomes these problems and provides an apparatus for connecting components without requiring tools and extensive skill, yet provides a strong connection that allows for later disassembly if so desired. Briefly, the present invention is a catch within a tab extending from one component that locks into a receiving opening on another component. The receiving opening is generally adjacent an edge of the second component. This edge of the second component slides between the tab and the component from which it extends. A catch extending from the tab snaps into the receiving opening of the second component and locks it into position.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENT(S)

Figure 1:
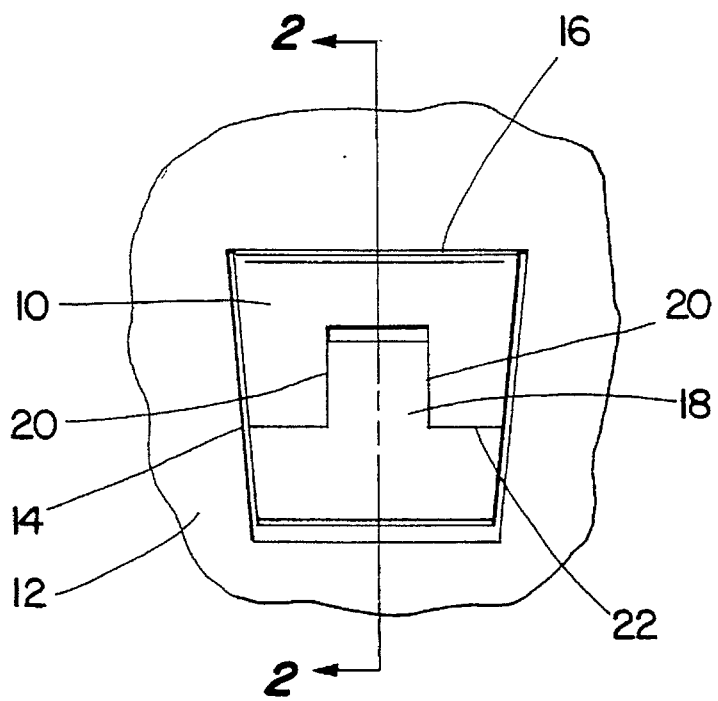
FIG. 1 is a front view of a preferred embodiment of the tab of the present invention.
Figure 2:
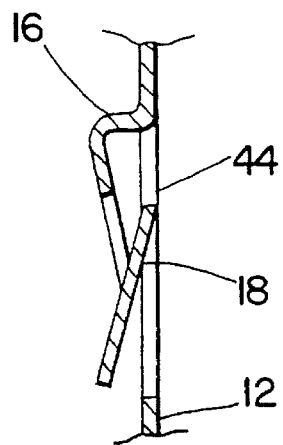
FIG. 2 is a section view through line 2—2 of FIG. 1 of the tab of the present invention.

Referring to FIG. 1, the front view of the tab 10 of the present invention is shown as a broken away section of a component 12 which will connect to another component. FIG. 2 is a section view of the tab of FIG. 1. Tab 10 may be formed from the surrounding component 12 by cutting an outer edge as shown generally at 14. The tab 10 is formed from the material of the surrounding component 12 and is preferably integral to that component along an edge 16. Thus, the tab is substantially parallel to the planar surface of component 12 but is offset slightly therefrom as can be seen in FIG. 2. A catch 18 may be formed from tab 10 by cutting an edge 20. The tab 10 may be bent along line 22, which is along the integral edge of the catch with the tab, to extend the distal end of the catch 18 toward the planar surface of component 12 as is shown in FIG. 2.

Figure 3:
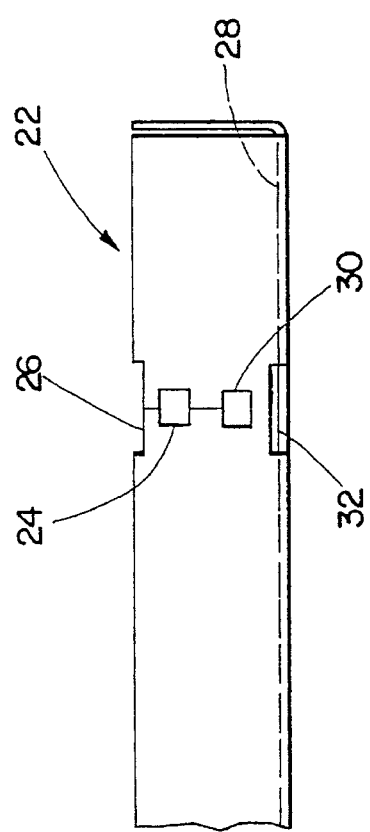
FIG. 3 is a front view of a component having a receiving opening of the present invention.

FIG. 3 is a front view of a receiving opening on a second component 22 to be connected to the first component 12. A receiving opening 24 is formed in the second component 22. Receiving opening 24 is adapted to receive the catch 18 of the tab 10 shown in FIGS. 1 and 2. Optionally, a notch 26 may be formed into the second component to accommodate a portion of the integral edge 16 of tab 10. The material of the second component that is between the notch 26 and the receiving opening 24 serves as a catch lock, the operation of which will be disclosed below. The second component 22 as shown in FIG. 3 may be of any material and size configuration suitable for the receiving opening. In the embodiment shown in FIG. 3, second component 22 has a fold at 28. A receiving opening is shown at 30 and a notch is shown at 32 to receive the tab 10 and catch 18 along the fold.

Preferably, the receiving openings 24 and 30 are positioned adjacent edges of the second component. This allows for the tab 10 to extend around the edge of the second component to allow the catch to reach the receiving opening. Optionally, the receiving opening may be located a distance away from an edge, however, the tab may need to be lengthened accordingly to allow the catch to reach it.

Figure 4:
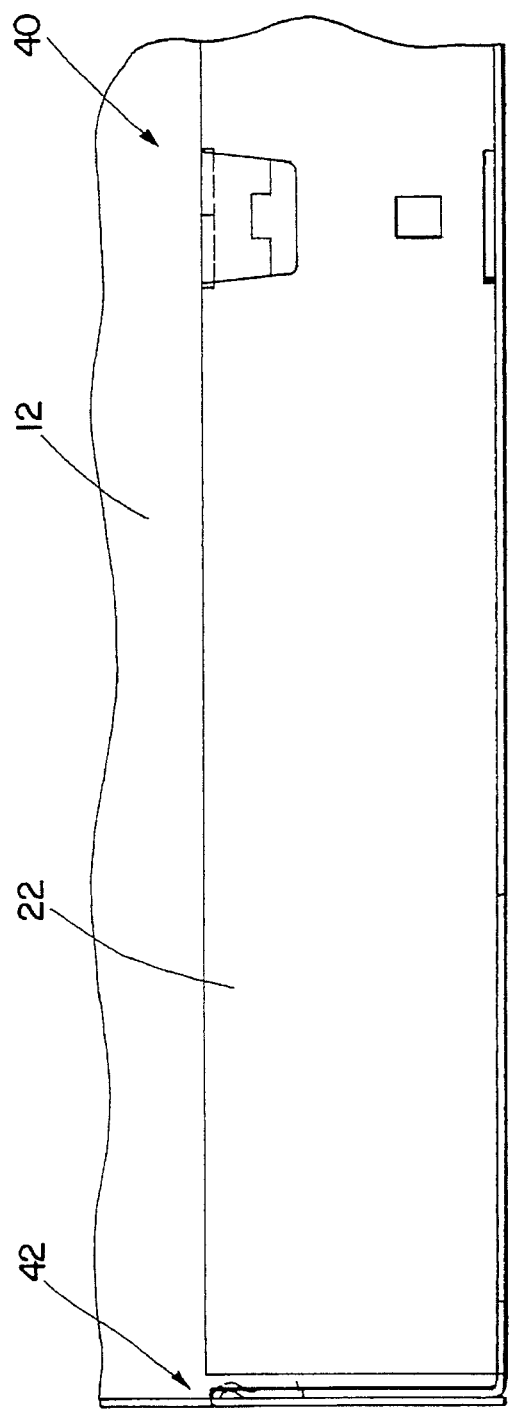
FIG. 4 is a view of two components secured together by the completed connection of the present invention.

FIG. 4 shows completed connections 40 and 42 between two components. The back of the second component 22 is shown in FIG. 4. The first component 12 is located behind the second component 22 and is connected at 40 and 42 to the second component. The connection is made by aligning the edge adjacent the receiving opening of the second component with the tab of the first component. The second component catch lock is then pressed between the tab 10 and past the catch until the catch snaps into the receiving opening. The tab may be constructed of resilient material that allows the catch to be pressed toward the tab as the second component slides against the catch. Once the catch is positioned within the receiving opening a blunt end 44 (see FIG. 2) of the catch may prevent the catch from leaving the receiving opening. Additionally, if the catch is of resilient material it may be biased into the receiving opening, thus preventing the blunt end of the catch from leaving the receiving opening laterally.

The connection of the present invention may be disconnected by pressing the catch out of the receiving opening until the blunt end of the catch clears the receiving opening. The second component may then be moved to a position where the receiving opening may not receive the catch. Pressure against the catch may then be released. The second component may then be moved to a position where it clears the tab. The present invention may be accomplished with the use of metal components, plastic components, other material components, and combinations of any of these materials.

The scope of the invention is not to be considered limited by the above disclosure, and modifications are possible without departing from the spirit of the invention as evidenced by the following claims.

What is claimed is:

1. A connection assembly, comprising:

a first member with a substantially planar surface;

a tab having a proximal edge and a distal end formed from a section of said planar surface, wherein said tab is integral with said planar surface along said proximal edge of said tab, wherein said tab is offset from said planar surface and disposed substantially parallel to said planar surface, and wherein said distal end of said tab does not extend beyond an edge of said first member;

a catch formed from said tab, wherein said catch is integral with said tab along a proximal edge of said catch, said proximal edge of said catch located at a point intermediate between said proximal edge of said tab and said distal end of said tab, said catch extending from said proximal edge of said catch to a distal end of said catch, said distal end of said catch located between said proximal edge of said catch and said proximal edge of said tab, wherein said distal end of said catch is biased towards said planar surface;

a second member with a substantially planar surface; and an opening formed in said planar surface of said second member, wherein said opening is configured to receive said distal end of said catch when said second member is positioned in a space between said tab and said planar surface of said first member.

2. The connection of claim 1, wherein said first and second members are comprised of sheet metal.

3. The connection of claim 1, wherein said catch is biased towards said planar surface by a bend in said tab, said bend extending across the width of said tab.

4. The connection of claim 3, wherein said proximal edge of said catch is integral with said bend of said tab.

5. The connection of claim 1, further comprising: a notch formed in said second member, wherein said notch is adapted to receive said proximal edge of said tab.

6. The connection of claim 5, wherein said opening is located adjacent said notch.

7. The connection of claim 5, wherein said notch is formed along an edge of said second member.

8. The connection of claim 5, wherein said notch is formed along a bend of said second member.

9. A connection, comprising:

a first sheet metal component;

a tab having a proximal edge and a distal end formed from a section of a substantially planar surface of said first sheet metal component, wherein said tab is integral to said first sheet metal component along said proximal edge of said tab, wherein said tab is offset from said planar surface and disposed substantially parallel to said planar surface, wherein said tab has a bend substantially parallel to said proximal edge and extending across the width of said tab, wherein said bend is closer to said planar surface than said proximal edge of said tab, and wherein said distal end of said tab does not extend beyond an edge of said first sheet metal component;

a catch formed from said tab, wherein said catch is integral to said tab along said bend in said tab thereby defining a proximal edge of said catch, said proximal edge of said catch located at a point intermediate between said proximal edge of said tab and said distal end of said tab, said catch extending from said proximal edge of said catch to a distal end of said catch, said distal end of said catch located between said proximal edge of said catch and said proximal edge of said tab, wherein said distal end of said catch is biased toward said planar surface;

a second sheet metal component;

a notch formed in said second sheet metal component, wherein said notch is configured to receive said proximal edge of said tab;

an opening formed in said planar surface of said second member, wherein said opening is configured to receive said distal end of said catch when said second sheet metal component is positioned in a space between said tab and said planar surface of said first sheet metal component, wherein said opening is located adjacent said notch.

10. The connection of claim 9, wherein said notch is formed along an edge of said second sheet metal component.

11. The connection of claim 9, wherein said notch is formed along a bend of said second sheet metal component.

* * * * *